US009571679B2

(12) United States Patent
Iwasa et al.

(10) Patent No.: US 9,571,679 B2
(45) Date of Patent: Feb. 14, 2017

(54) IMAGE PROCESSING SYSTEM AND INFORMATION SYNCHRONIZING METHOD (71) Applicants: Keisuke Iwasa, Kanagawa (JP); Shigeo Negoro, Tokyo (JP); Kiyohiko Shinomiya, Tokyo (JP)

(72) Inventors: Keisuke Iwasa, Kanagawa (JP); Shigeo Negoro, Tokyo (JP); Kiyohiko Shinomiya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 14/080,027

(22) Filed: Nov. 14, 2013

(65) Prior Publication Data
US 2014/0153043 A1   Jun. 5, 2014

(30) Foreign Application Priority Data
Dec. 4, 2012  (JP) ................. 2012-264965

(51) Int. Cl.
*G04G 7/00* (2006.01)
*H04N 1/00* (2006.01)

(52) U.S. Cl.
CPC ...... *H04N 1/00496* (2013.01); *H04N 1/00538* (2013.01); *H04N 1/00941* (2013.01); *H04N 1/00498* (2013.01); *H04N 2201/0094* (2013.01)

(58) Field of Classification Search
CPC .............. G04G 7/00; G06F 1/04; G06F 1/12; G11C 7/222
USPC ..................... 399/81; 709/246, 248; 713/400
See application file for complete search history.

(56) References Cited

U.S. PATENT DOCUMENTS

| 7,365,872 | B2 * | 4/2008 | Lawrence | G06F 3/1208 358/1.15 |
| 2004/0117310 | A1 * | 6/2004 | Mendez | G06F 21/62 705/50 |
| 2004/0145973 | A1 * | 7/2004 | Nagashima | 368/107 |
| 2012/0105893 | A1 * | 5/2012 | Ito | 358/1.13 |

FOREIGN PATENT DOCUMENTS

| JP | 2003-143053 | 5/2003 |
| JP | 2007-174215 | 7/2007 |
| JP | 2007-258892 | 10/2007 |
| JP | 2010-011227 | 1/2010 |

* cited by examiner

*Primary Examiner* — Peter K Huntsinger
(74) *Attorney, Agent, or Firm* — Harness, Dickey & Pierce, P.L.C.

(57) ABSTRACT

An image processing system includes a main unit of an image processing apparatus and an operational unit. The operational unit includes a request receiver that receives a request to modify operational unit administrative information, an administrative information modifying unit that modifies the operational unit administrative information in response to the received request to modify, and an administrative information reporting unit that reports modified content of the operational unit administrative information to the main unit of the image processing apparatus. The main unit of the image processing apparatus includes an apparatus information synchronizer that modifies the apparatus administrative information that corresponds to the reported modified content after receiving the modified content of the operational unit administrative information from the operational unit.

20 Claims, 4 Drawing Sheets

FIG. 2

IMAGE PROCESSING SYSTEM AND INFORMATION SYNCHRONIZING METHOD

CROSS-REFERENCE TO RELATED APPLICATION

This patent application is based on and claims priority pursuant to 35 U.S.C. §119 to Japanese Patent Application No. 2012-264965, filed on Dec. 4, 2012 in the Japan Patent Office, the entire disclosure of which is hereby incorporated by reference herein.

BACKGROUND

Technical Field

The present invention relates to an image processing system and information synchronizing method.

Background Art

Conventionally, in image processing apparatuses such as printers, facsimile machines, copiers, multifunctional peripherals (MFP), and scanners, operational commands are input via an operation display unit fixedly mounted on the image processing apparatus and various information from the image processing apparatus is displayed on the operation display unit.

Technologies that make the operation display unit removable from the image processing apparatus, and accept operation and displays information on the operation display unit performing communication between the operation display unit and the main unit of the image processing apparatus, have been proposed (e.g., JP-2009-186607-A).

SUMMARY

An example embodiment of the present invention provides an image processing system that includes a main unit of an image processing apparatus operates on an apparatus OS and performs image processing based on apparatus administrative information managed by the apparatus OS, and an operational unit that operates on an operational unit OS independent of the apparatus OS and accepts operation on the main unit of the image processing apparatus based on operational unit administrative information managed by the operational unit OS. The operational unit includes a request receiver that receives a request to modify operational unit administrative information, an administrative information modifying unit that modifies the operational unit administrative information in response to the received request to modify, and an administrative information reporting unit that reports modified content of the operational unit administrative information to the main unit of the image processing apparatus. The main unit of the image processing apparatus includes an apparatus information synchronizer that modifies the apparatus administrative information that corresponds to the reported modified content after receiving the modified content of the operational unit administrative information from the operational unit.

An example embodiment of the present invention includes an information synchronizing method executed by the image processing system. The information synchronizing method includes the steps of receiving a request to modify the apparatus administrative information, modifying the apparatus administrative information in accordance with the received request to modify the apparatus administrative information, reporting modified content of the apparatus administrative information to the operational unit, and modifying the apparatus administrative information that corresponds to modified content of the operational unit administrative information if the modified content of the operational unit administrative information is reported from the operational unit. The information synchronizing method, performed by the operational unit, includes the steps of receiving a request to modify the operational unit administrative information, modifying the operational unit administrative information in accordance with the received request to modify the operational unit administrative information, reporting modified content of the operational unit administrative information to the main unit of the image processing apparatus, and modifying the operational unit administrative information that corresponds to modified content of the operational unit administrative information if the modified content of the apparatus administrative information is reported from the main unit of the image processing apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the conventional technology, the operation display unit is removable from the image processing apparatus. Basically, the operation display unit works on an operating system (OS) of the image processing apparatus, and information necessary for operation is exchanged as appropriate.

With such a configuration, it is possible that a different OS is installed in each of the main unit of the image processing apparatus and the operation display unit, and each of the main unit of the image processing apparatus and the operation display unit implements functions independently.

However, if a different OS is installed in each of the main unit of the image processing apparatus and the operation display unit, administrative information managed by each OS is not synchronized timely and automatically between the two. Consequently, the administrative information managed by both OSs, such as time, may be different between the main unit of the image processing apparatus and the operation display unit. In addition, the administrative information regarding image processing at the main unit of the image processing apparatus can be different.

Some differences in information between the main unit of the image processing apparatus and the operation display unit are acceptable and some are not. For example, differences in time information can be unacceptable information. That is, regarding license invalidation time for applications installed in the main unit of the image processing apparatus, there are cases in which that information can be unacceptable, such as when the invalidation time displayed on the operation display unit is different from the invalidation time stored in the main unit of the image processing apparatus, time displayed on the operation display unit is different from the time actually printed by the main unit of the image processing apparatus in time-specified printing, printing time displayed on the operation display unit is different from the time actually printed on printed matter by the main unit of the image processing apparatus, time displayed on the operation display unit is different from logged time when the main unit of the image processing apparatus printed, and time when power of the main unit of the image processing apparatus is actually turned on and off by a weekly timer is different from the time displayed on the operation display unit.

In the following embodiment, an image processing system is provided in which administrative information managed by different OS installed in each of the main unit of the image processing apparatus and the operation display unit, respectively, is synchronized promptly, and image processing is optimized.

Figure 1:
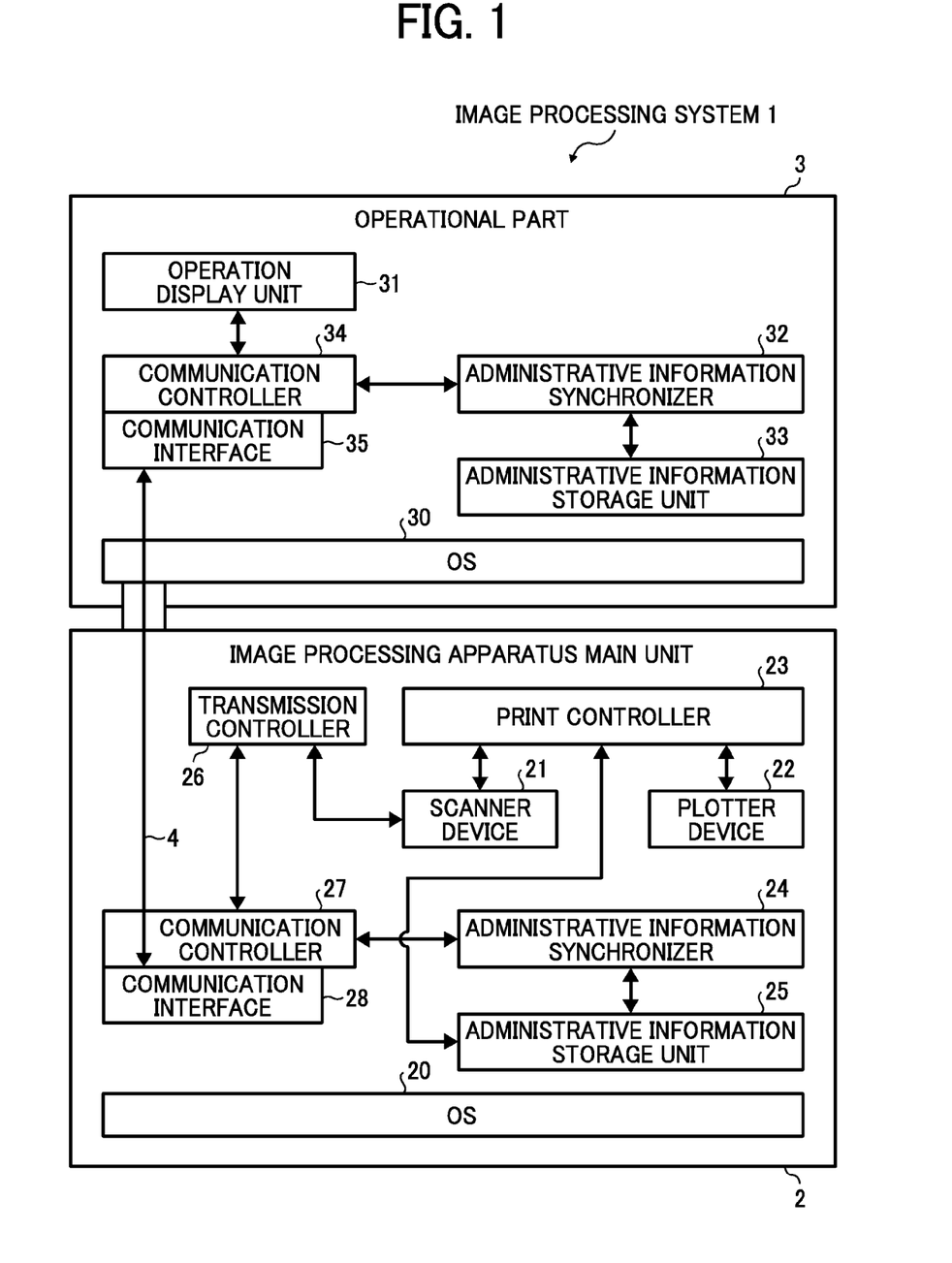
FIG. 1 is a block diagram illustrating an image processing system as an embodiment of the present invention.

FIG. 1 is a block diagram illustrating an image processing system 1 in this embodiment. In FIG. 1, the image processing system 1 includes a main unit of an image processing apparatus 2 and an operational part 3. The operational part 3 is connected to the main unit of the image processing apparatus 2 via a wired communication channel 4 such as Universal Serial Bus (USB). The operational part can also be connected via a wireless communication channel as appropriate.

The main unit of the image processing apparatus 2 is the main unit of the image processing apparatus 2, which is a facsimile machine, a copier, a printer, a scanner, or a MFP. In this embodiment, an MFP is used as the image processing apparatus. The main unit of the image processing apparatus 2 includes necessary hardware such as a scanner device 21 and a plotter device 22. The main unit of the image processing apparatus 2 executes various functions that use hardware, such as printing, scanning, copying, faxing, folder transmission, and mail communication by installing various applications on an OS 20 stored in a hard disk drive (HDD) or a Read Only Memory (ROM). In the present embodiment, a generic OS such as UNIX is used as the OS 20 in the main unit of the image processing apparatus 2.

That is, the main unit of the image processing apparatus 2 executes an information synchronizing method that synchronizes administrative information in the main unit of the image processing apparatus 2 (apparatus administrative information) with administrative information in the operational part 3 (operational part administrative information) by reading an information synchronizing program for the main unit of the image processing apparatus 2 that executes an information synchronizing method run on the main unit of the image processing apparatus 2 among information synchronizing methods in the present invention stored on a computer-readable media such as a ROM, Electrically Erasable and Programmable Read Only Memory (EEPROM), EPROM, flash memory, flexible disk, Compact Disc Read Only Memory (CD-ROM), Compact Disk Rewritable (CD-RW), Digital Versatile Disk (DVD), Secure Digital (SD) card, and Magneto-Optical (MO) disk and installing the program in a nonvolatile memory or a hard disk drive (not shown in figures). The information synchronizing program is a computer-executable program written in legacy programming languages and object oriented programming languages such as assembler, C, C++, C#, and Java, and can be distributively stored on the storage media described above.

As described above, the main unit of the image processing apparatus 2 includes units necessary for the image processing apparatus, such as the scanner device 21 and the plotter device 22, and units such as a print controller 23, an administrative information synchronizer 24, an administrative information storage unit 25, a transmission controller 26, a communication controller 27, and communication interface 28 are constructed by installing information synchronizing programs for the main unit of the image processing apparatus 2.

The scanner device 21 uses an image scanner employing a Charge Coupled Device (CCD) or Complementary Metal Oxide Semiconductor (CMOS), and generally includes an Auto Document Feeder (ADF). The ADF feeds documents one by one to a document reading position of the scanner device 21. The scanner device 21 illuminates the document transferred from the ADF, converts the light reflected by the document photoelectrically using the CCD or CMOS, and reads an image on the document at a predefined resolution. In addition, the scanner device 21 performs necessary image processing on the read image data and passes it to the transmission controller 26. The plotter device 22 outputs (forms) an image on a recording medium such as paper based on drawing data and control signals passed from the print controller 23, and discharges the printed paper onto a paper output tray.

That is, in the case of an electrophotographic engine, the plotter device 22 includes an image forming unit consisted of units necessary to process printing based on the drawing data, such as a photoconductor, a charging unit, an optical-writing unit, a developer, a transferring unit, and a cleaning unit. If the plotter device 22 is a color plotter, the plotter device 22 includes the image forming units for a number of colors, e.g., CMYK. The plotter device 22 operates the optical-writing unit using the drawing data and the control signal, forms an electrostatic latent image on the photoconductor charged uniformly by the charging unit, and forms a toner image by supplying toner on the photoconductor and developing the image using the developer. Subsequently, the plotter device 22 supplies paper into a gap between the photoconductor and the transferring unit from a paper feeding unit, transfers the toner image on the photoconductor to the paper using the transferring unit, carries the paper on which the toner image is transferred to a fixing unit, and fixes the toner image on the paper by heating and pressing the paper using the fixing unit.

The print controller 23 is connected to the scanner device 21, the plotter device 22, and the administrative information storage unit 25 and controls the scanner device 21, the plotter device 22 and other units based on the apparatus administrative information stored in the administrative information storage unit 25 and managed by the OS 20.

The administrative information storage unit 25 consists of nonvolatile memory etc., and stores administrative information necessary for the operation of the main unit of the image processing apparatus 2. The administrative information includes various administrative information managed by the OS 20 itself and various administrative information managed by various application software that run on the OS 20, etc., and is collectively referred to as "administrative information" or "apparatus administrative information" hereinafter.

The communication interface 28 communicates with the operational part 3 via a communication channel 4 such as a USB. The communication controller 27 transfers data to each unit in the main unit of the image processing apparatus 2 controlling the data received via the communication interface 28, and transfers data to the operational part 3 and other apparatuses via the communication interface 28 controlling the data received from each unit in the main unit of the image processing apparatus 2.

The administrative information synchronizer 24 (comprised of a request to modify apparatus administrative information receiver, apparatus administrative information modifying unit, apparatus administrative information reporter, apparatus information synchronizer) manages the administrative information (apparatus administrative information) stored in the administrative information storage unit 25 described above. After the operational part 3 reports modified content of the operational part administrative information, the administrative information synchronizer 24 modifies the apparatus administrative information that corresponds to the reported modified content. In addition, the administrative information synchronizer 24 receives a request to modify the apparatus administrative information from a client PC, etc., connected via a network via the communication interface 28, and modifies the apparatus administrative information in accordance with the received request to modify. Furthermore, the administrative information synchronizer 24 reports to the operational part 3 via the communication interface 28 about the modified content of the apparatus administrative information.

The transmission controller 26 performs folder transmission that transfers the image data read by the scanner device 21 to another apparatus via the communication interface 28 and stores the image data in a folder in a storage unit of the apparatus, mail transmission that transfers mail attaching document image data to another apparatus via a network using Server Message Block (SMB), and outputs such as electronic media writing output that writes in USB memory and SD memory mounted on the main unit of the image processing apparatus 2 removably, printing output by itself, and displaying output on the operational part 3.

In this embodiment, in the main unit of the image processing apparatus 2, the operational part 3 connected to the main unit of the image processing apparatus 2 via the wired communication channel 4 such as USB is used as the operation display unit. Otherwise, one or more operational parts 3 configured as portable terminal devices separate from the main unit of the image processing apparatus 2 and connected to the main unit of the image processing apparatus 2 via a wireless communication channel. In this case, the main unit of the image processing apparatus 2 can include an operation display unit (not shown in figures) controlled by the OS 20 in the main unit of the image processing apparatus 2. The operation display unit includes operational keys that input commands to operate various functions of the main unit of the image processing apparatus 2 and a display that displays various necessary information. By inputting a request to modify the apparatus administrative information on the operation display unit, the administrative information synchronizer 24 in the main unit of the image processing apparatus 2 can receive the request to modify the apparatus administrative information.

The operational part 3 includes hardware such as an operation display unit 31 and executes various functions and communications, etc., that utilize the hardware by installing various application on the OS 30 stored in the ROM and RAM. The operational part 3 adopts OS such as UNIX same as the OS 20 in the main unit of the image processing apparatus 2 or Android, iOS, and Windows different from the OS 20 as the OS 30 independent of the OS 20.

That is, the operational part 3 executes an information synchronizing method (described in detail later) that synchronizes information in the operational part 3 with information in the main unit of the image processing apparatus 2 by reading an information synchronizing program for the operational part 3 that executes an information synchronizing method run on the operational part 3 among information synchronizing methods in the present invention stored in computer-readable media such as a ROM, EEPROM, EPROM, flash memory, flexible disk, CD-ROM, CD-RW, DVD, SD card, and MO disk and installing the program in nonvolatile memory such as ROM (not shown in figures). The information synchronizing program is a computer-executable program written in legacy programming languages and object oriented programming languages such as assembler, C, C++, C#, and Java, and can be distributed storing in storage media described above.

An operation display application necessary to operate as the operation display unit that instructs the main unit of the image processing apparatus 2 to execute various functions is installed in the operational part 3. Consequently, the operational part 3 functions as the operational part of the main unit of the image processing apparatus 2.

As described above, the operational part 3 includes units necessary for the operational part 3 such as the operation display unit 31, and an administrative information synchronizer 32, an administrative information storage unit 33, a communication controller 34, and communication interface 35 are constructed by installing information synchronizing programs for the operational part 3.

The administrative information storage unit 33 consists of nonvolatile memory, etc., and stores various administrative information necessary for the operation of the operational part 3, especially various information necessary for the operational part 3 to function as the operation display unit of the main unit of the image processing apparatus 2. The administrative information includes various administrative information managed by the OS 30 itself and various administrative information managed by various application software that run on the OS 30 etc., and is referred to as "operational part administrative information" as appropriate hereinafter.

If any of the operational part administrative information stored in the administrative information storage unit 33 and needed to be synchronized with the apparatus administrative information managed by the main unit of the image processing apparatus 2 is modified, the administrative information synchronizer 32 synchronizes with corresponding information in the main unit of the image processing apparatus 2. That is, after receiving a request to modify the operational part administrative information, the administrative information synchronizer 32 modifies the operational part administrative information in accordance with the request to modify. In addition, the administrative information synchronizer 32 reports to the main unit of the image processing apparatus 2 via the communication interface 35 the modified content of the operational part administrative information. Furthermore, after the modified content of the apparatus administrative information is reported from the main unit of the image processing apparatus 2, the administrative information synchronizer 32 modifies the operational part administrative information corresponding to the reported modified content.

The communication interface 35 communicates with the main unit of the image processing apparatus 2 via the communication channel 4 such as USB described above.

The communication controller 34 transfers data to each unit in the operational part 3 controlling the data received via the communication interface 35, and transfers data to the main unit of the image processing apparatus 2 and other apparatuses via the communication interface 35 controlling the data received from each unit in the operational part 3. In addition, the communication controller 34 receives a request to modify the operational part administrative information input from the operation display unit 31 and passes it to the administrative information synchronizer 32.

Next, operation of this embodiment will be described below.

In the image processing system 1 in this embodiment, each of the main unit of the image processing apparatus 2 and the operational part 3 adopts the OS 20 and the OS 30 independently, and the administrative information managed by the OS 20 and the OS 30 is synchronized promptly.

There are various types of information managed by the OS 20 installed in the main unit of the image processing apparatus 2 and by the OS 30 installed in the operational part 3 that comprises the image processing system 1 and need to be synchronized. Those are necessarily synchronized information that is synchronized necessarily, basically synchronized information that is synchronized basically and sometimes initialized, and occasionally synchronized information that is synchronized basically but sometimes not synchronized.

For example, current time, proxy information used in connecting to a network, Dynamic Host Configuration Protocol (DHCP) information, and available application information can be considered as examples of the necessarily synchronized information.

In addition, language, summer time information, date display format information, warning sound, login name, and password can be considered as examples of the basically synchronized information. The warning sound is volume of warning sound that notifies a user of failure such as jamming, and its initial value is warning sound on to notify the user of the failure even if it is set as off. Sometimes it is appropriate to initialize the login name and password to prevent other accounts from being held between the operational part 3 and the main unit of the image processing apparatus 2.

Furthermore, logoff timer, auto reset timer, and media volume can be considered as examples of the occasionally synchronized information. The logoff time is time to logoff automatically after predetermined time without any operation, and sometimes it is not synchronized to avoid security hole. The media volume is volume of played sound, and it is synchronized basically. However, sometimes it is not synchronized since it does not affect fundamental performance.

Figure 2:
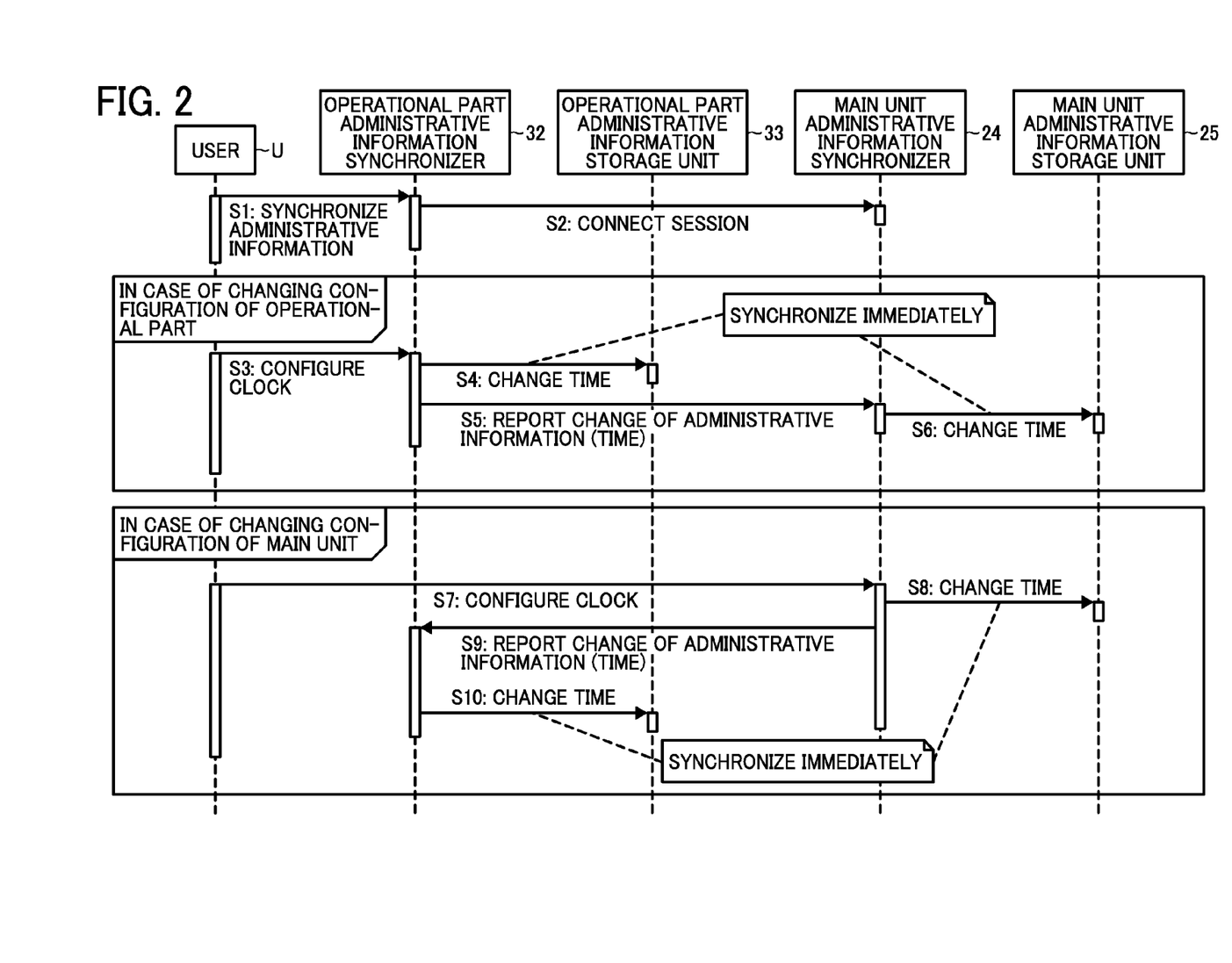
FIG. 2 is a sequence diagram illustrating a synchronizing process to modify time configuration as an embodiment of the present invention.

First, taking current time information as an example, a synchronizing process of the necessarily synchronized information will be described below with reference to FIG. 2. As shown in FIG. 2, the image processing system 1 has an initializing mode.

In the initializing mode, the image processing system 1 can be configured to either perform or not perform synchronization in case the administrative information is modified, set initial value in case it is prohibited from being modified information even if there was a request to modify the administrative information, or select either initial value or current setting value in case it is prohibited from being modified information even if there was a request to modify the administrative information.

As shown in FIG. 2, in the image processing system 1, synchronization setting on administrative information (such as enable/disable of synchronization, setting initial value, selecting initial value or current value etc.) of the administrative information synchronizer 32 is configured by operating a touch panel on the operation display unit 31 of the operational part 3 in S1. After performing synchronization setting, the administrative information synchronizer 32 establish session with the administrative information synchronizer 24 in the main unit of the image processing apparatus 2 and reports the setting information on synchronizing in S2.

After configuring the current time as the necessarily synchronized information by operating the operation display unit 31 of the operational part 3, the communication controller 34 acquires the modified current time and reports the modified current time information to the administrative information synchronizer 32 in S3.

The administrative information synchronizer 32 modifies the current time information stored in the administrative information storage unit 33 into the modified current time information in S4. In addition, the administrative information synchronizer 32 reports notification of modifying the current time information to the administrative information synchronizer 24 in the main unit of the image processing apparatus 2 via the communication controller 34 and the communication interface 35 in S5.

In the main unit of the image processing apparatus 2, after the communication interface 28 receives the notification of modifying the current time information from the operational part 3, the administrative information synchronizer 24 modifies time information in the administrative information storage unit 25 based on the reported modified current time information in S6.

Similarly, in the image processing system 1, if the current time information in the main unit of the image processing apparatus 2 is modified by using a client PC, etc., connected to the main unit of the image processing apparatus 2 via a network, the communication controller 27 acknowledges that the current time information is modified and reports that to the administrative information synchronizer 24 in S7.

After receiving the notification of modifying the current time information, the administrative information synchronizer 24 modifies current time information stored in the administrative information storage unit 25 into the modified current time information in S8. In addition, the administrative information synchronizer 24 transfers the notification of modifying the current time information to the administrative information synchronizer 32 in the operational part 3 via the communication controller 27 and the communication interface 28 in S9.

In the operational part 3, after the communication interface 35 receives the notification of modifying the current time information from the main unit of the image processing apparatus 2, the administrative information synchronizer 32 modifies time information in the administrative information storage unit 33 based on the reported modified current time information in S10.

As described above, if administrative information needed to be synchronized between the main unit of the image processing apparatus 2 whose OS is the OS 20 and the operational part 3 whose OS is the OS 30 different from the OS 20 is modified, it is possible to synchronize the modified contents promptly. Consequently, regarding license expiration time of application installed in the main unit of the image processing apparatus 2, a case in which expiration time displayed on the operational part 3 is different from the expiration time in the main unit of the image processing apparatus 2 can be avoided. Similarly, in time-specified printing, a case in which time displayed on the operational part 3 is different from the time when the main unit of the image processing apparatus 2 actually performs printing can be avoided; a case in which printing time displayed on the operational part 3 is different from the time printed on a printout by the main unit of the image processing apparatus 2 can be avoided; a case in which time displayed on the operational part 3 is different from logged time when the main unit of the image processing apparatus 2 performs printing can be avoided; and a case in which time when the main unit of the image processing apparatus 2 is actually turned on/off by a weekly timer is different from the time displayed on the operational part 3 can be avoided.

Next, taking language information as an example, a synchronizing process of the basically synchronized information will be described below with reference to FIG. 3.

Figure 3:
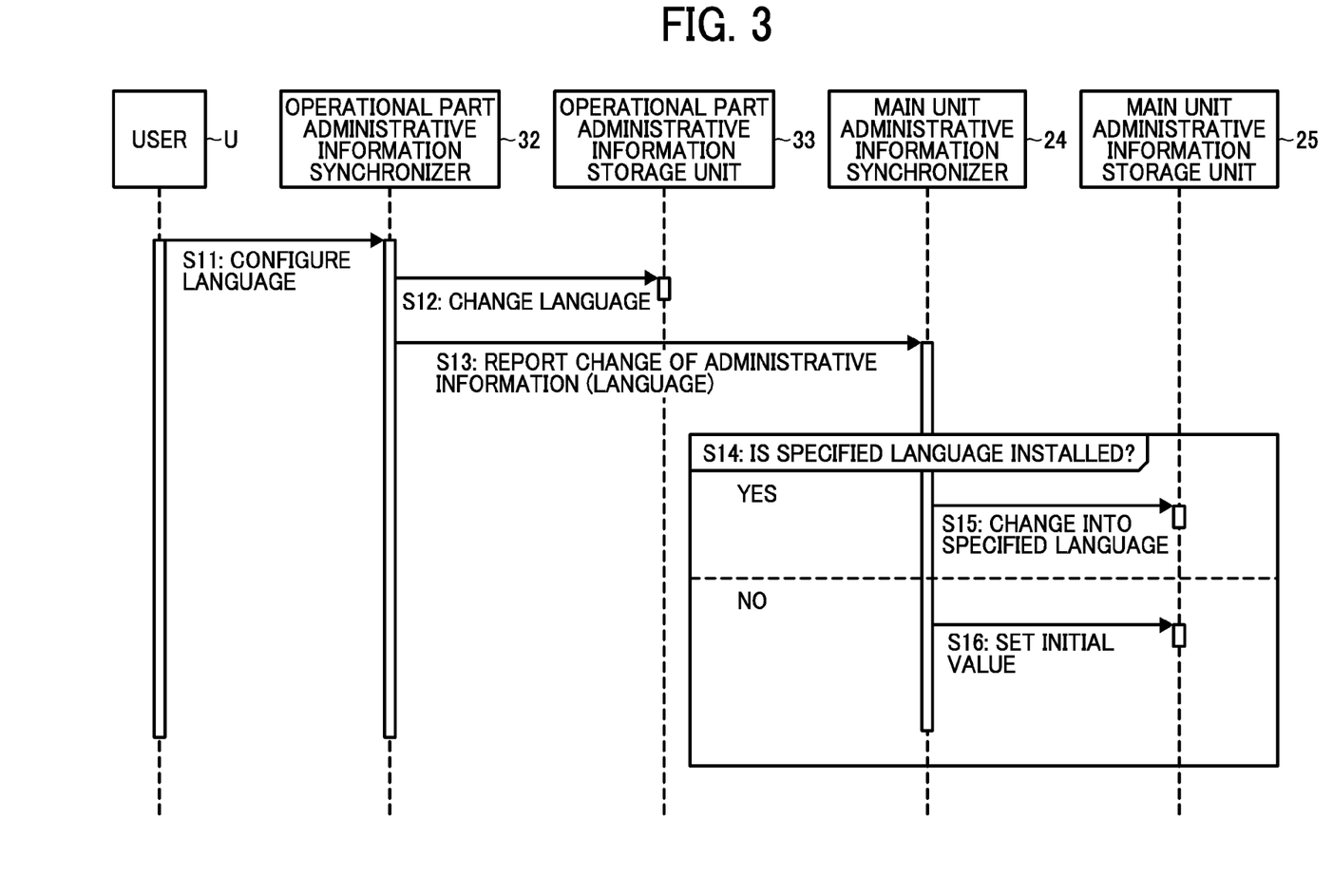
FIG. 3 is a sequence diagram illustrating a synchronizing process to modify language configuration as an embodiment of the present invention.

As shown in FIG. 3, in the image processing system 1, if the language setting is modified by operating the operation display unit 31 of the operational part 3, the communication controller 34 acknowledges the modification of the language information and reports the modified language information to the administrative information synchronizer 32 in S11.

The administrative information synchronizer 32 modifies the language information stored in the administrative information storage unit 33 to the modified language information in S12. In addition, the administrative information synchronizer 32 reports notification of modifying the language information to the administrative information synchronizer 24 in the main unit of the image processing apparatus 2 via the communication controller 34 and the communication interface 35 in S13.

In the main unit of the image processing apparatus 2, after the communication interface 28 receives the notification of modifying the language information, the administrative information synchronizer 24 checks whether or not the reported modified language is available in S14.

If the reported modified language is available, the administrative information synchronizer 24 modifies language information in the administrative information storage unit 25 into the modified language information in S15.

If the reported modified language is not available, the administrative information synchronizer 24 configures the language information in the administrative information storage unit 25 as an initial value in S16.

Although not shown in FIG. 3, if the language information in the main unit of the image processing apparatus 2 is modified by using a client PC, etc., connected to the main unit of the image processing apparatus 2 via a network, the language information is synchronized similarly in the case in FIG. 3 in the same way as performing the configuration operation on the administrative information synchronizer 24 in the main unit of the image processing apparatus 2 shown in FIG. 2. In this case, in the operational part 3, if the reported modified language is not stored in the administrative information storage unit 33, the administrative information synchronizer 32 configures the language information in the administrative information storage unit 33 as an initial value.

As described above, if the basically synchronized information needed to be synchronized between the main unit of the image processing apparatus 2 whose OS is the OS 20 and the operational part 3 whose OS is the OS 30 independent of the OS 20 is modified on either the main unit of the image processing apparatus 2 or the operational part 3, it is possible to synchronize the modified basically synchronized information promptly. In addition, the basically synchronized information that cannot be synchronized or needs to be initialized can be configured as an initial value. Consequently, taking the warning sound as an example, the warning sound can be configured as off if it is unnecessary. However, if the user U is physically challenged, the warning sound should be on. Therefore, if the initial value is configured as on, it can be reconfigured as the warning sound on.

Next, taking application administrative information as an example, a synchronizing process of the occasionally synchronized information will be described below with reference to FIG. 4.

Figure 4:
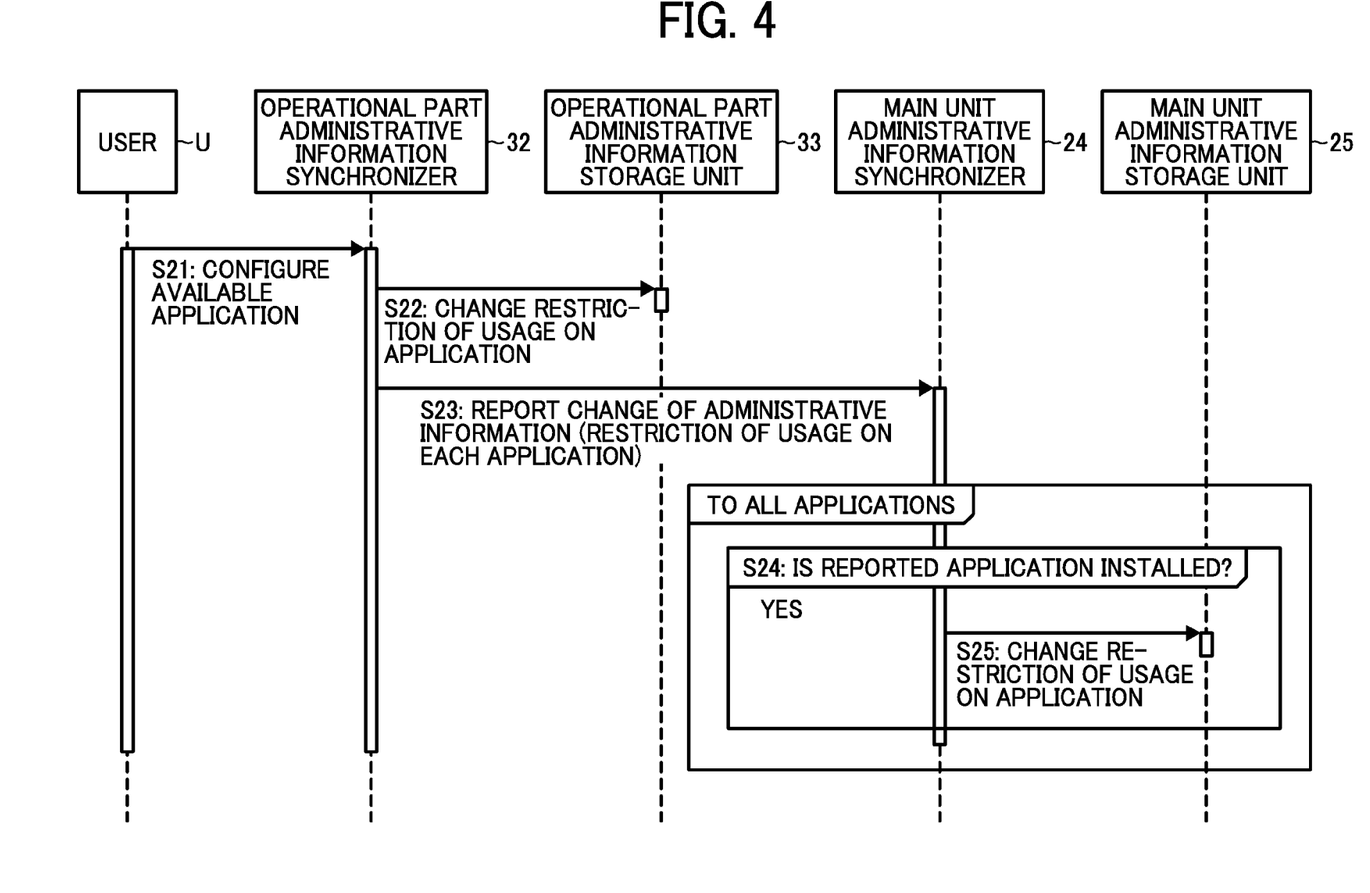
FIG. 4 is a sequence diagram illustrating a synchronizing process to modify application information configuration unattended with modifying initial value as an embodiment of the present invention.

As shown in FIG. 4, in the image processing system 1, if setting of usage permission of application as administrative information is modified by operating the operation display unit 31 of the operational part 3, the communication controller 34 acknowledges the modification of the usage permission setting of application and reports the modified usage permission information of application to the administrative information synchronizer 32 in S21.

The administrative information synchronizer 32 modifies usage permission information of application stored in the administrative information storage unit 33 into the modified usage permission information of application in S22. In addition, the administrative information synchronizer 32 reports notification of modifying the usage permission information of application to the administrative information synchronizer 24 in the main unit of the image processing apparatus 2 via the communication controller 34 and the communication interface 35 in S23.

In the main unit of the image processing apparatus 2, after the communication interface 28 receives the notification of modifying the usage permission information of application, the administrative information synchronizer 24 searches all applications and checks whether or not the reported modified application is available based on the reported modified usage permission information of application in S24.

If the reported modified application is available, the administrative information synchronizer 24 changes the usage permission information of application in the administrative information storage unit 25 into the modified usage permission information of application in S25.

If the reported modified application is not available, the administrative information synchronizer 24 ignores the notification or reports the administrative information synchronizer 32 in the operational part 3 that the application is not installed (not shown in FIG. 4) since the usage permission information of application is meaningless.

Although not shown in FIG. 4, if the usage permission information of application in the main unit of the image processing apparatus 2 is modified by using a client PC, etc., connected to the main unit of the image processing apparatus 2 via a network, the usage permission information of application is synchronized similarly as the case in FIG. 4 in the same way as performing the configuration operation on the administrative information synchronizer 24 in the main unit of the image processing apparatus 2 shown in FIG. 2.

As described above, if the occasionally synchronized information needed to be synchronized between the main unit of the image processing apparatus 2 whose OS is the OS 20 and the operational part 3 whose OS is the OS 30 independent of the OS 20 is modified on either the main unit of the image processing apparatus 2 or the operational part 3, it is possible to synchronize the modified basically synchronized information promptly. In addition, if the occasionally synchronized information that cannot or need not be synchronized, the request to synchronize is ignored. Consequently, taking the logoff timer that logs off automatically if preset time has passed without operation to enhance security as an example, if the logoff time configuration is modified, the synchronizing process is performed basically. However, if that can be a security hole, sometimes the synchronizing process is not performed.

As described above, the image processing system 1 in this embodiment includes the main unit of the image processing apparatus 2 that operates on the OS 20 (apparatus OS) based on the apparatus administrative information managed by the OS 20 and performs image processing and the operational part 3 that operates on the OS 30 (operational part OS) independent of the OS 20 based on the operational part administrative information managed by the OS 30 and performs operation processing at the main unit of the image processing apparatus 2. The operational part 3 includes the administrative information synchronizer 32 (a request to modify the operational part administrative information receiver) that receives a request to modify the operational part administrative information, the administrative information synchronizer 32 (operational part administrative information modifying unit) that modifies the operational part administrative information in accordance with the received request to modify, and the administrative information synchronizer 32 (operational part administrative information reporting unit) that reports the modified content of the operational part administrative information to the main unit of the image processing apparatus 2. The main unit of the image processing apparatus 2 includes the administrative information synchronizer 24 (apparatus information synchronizer) that modifies the apparatus administrative information that corresponds to the reported modified content.

Consequently, administrative information managed by the OS 20 on the main unit of the image processing apparatus 2 can be synchronized with administrative information managed by the OS 30 independent of the OS 20 on the operational part 3 promptly, and it is possible to optimize the image processing.

In addition, the image processing system 1 in this embodiment includes the main unit of the image processing apparatus 2 that operates on the OS 20 based on the apparatus administrative information managed by the OS 20 and performs image processing and the operational part 3 that operates on the OS 30 independent of the OS 20 based on the operational part administrative information managed by the OS 30 and performs operation processing at the main unit of the image processing apparatus 2. The main unit of the image processing apparatus 2 includes the administrative information synchronizer 24 (a request to modify the apparatus administrative information receiver) that receives a request to modify the apparatus administrative information, the administrative information synchronizer 24 (apparatus administrative information modifying unit) that modifies the apparatus administrative information in accordance with the received request to modify, and the administrative information synchronizer 24 (apparatus administrative information reporting unit) that reports the modified content of the apparatus administrative information to the operational part 3. The operational part 3 includes the administrative information synchronizer 32 (operational part information synchronizer) that modifies the operational part administrative information that corresponds to the reported modified content.

Consequently, for example, if a client PC accesses the main unit of the image processing apparatus 2, and the administrative information managed by the OS 20 in the main unit of the image processing apparatus 2 is modified, administrative information managed by the OS 20 on the main unit of the image processing apparatus 2 can be synchronized with administrative information managed by the OS 30 independent of the OS 20 on the operational part 3 promptly, and it is possible to optimize the image processing.

In addition, in the image processing system 1 in this embodiment, the main unit of the image processing apparatus 2 includes the administrative information synchronizer 24 (a request to modify the apparatus administrative information receiver) that receives a request to modify the apparatus administrative information, the administrative information synchronizer 24 (apparatus administrative information modifying unit) that modifies the apparatus administrative information in accordance with the received request to modify, and the administrative information synchronizer 24 (apparatus administrative information reporting unit) that reports the modified content of the apparatus administrative information to the operational part 3. The operational part 3 includes the administrative information synchronizer 32 (operational part information synchronizer) that modifies the operational part administrative information that corresponds to the reported modified content.

Consequently, for example, if a client PC accesses the main unit of the image processing apparatus 2, and the administrative information managed by the OS 20 in the main unit of the image processing apparatus 2 is modified, and if the apparatus information is modified on the operational part separate from the main unit of the image processing apparatus 2, administrative information managed by the OS 20 on the main unit of the image processing apparatus 2 can be synchronized with administrative information managed by the OS 30 independent of the OS 20 on the operational part 3 promptly, and it is possible to optimize the image processing.

Furthermore, in the image processing system 1 in this embodiment, if the apparatus administrative information that corresponds to the reported modified content is prohibited to change, the administrative information synchronizer 24 (administrative information synchronizer) in the main unit of the image processing apparatus 2 initializes the apparatus administrative information or does not modify the apparatus administrative information.

Consequently, between the main unit of the image processing apparatus 2 in which the OS 20 is installed and the operational part 3 that the OS 30 independent of the OS 20 is installed, the administrative information managed by the OS 20 can be synchronized with the administrative information managed by the OS 30 if they can be synchronized or need to be synchronized. Otherwise, if that administrative information does not need to be synchronized or cannot be synchronized, it is initialized or not modified so that appropriate image processing can be guaranteed. For example, assuming that Japanese, English, and Chinese can be configured as language setting on the operational part 3 and only English and French can be configured as language setting on the main unit of the image processing apparatus 2, if Japanese is configured on the operational part 3, Japanese cannot be configured on the main unit of the image processing apparatus 2. In this case, after receiving the notification to modify the language setting to Japanese from the operational part 3, the main unit of the image processing apparatus 2 set an initial value (e.g., English) to the language setting in order to improve usability. In other cases, for example, if application information available for a user is initialized, application usability for the user can be deteriorated or that can lead to security hole. To cope with this issue, usability and security can be enhanced by not modifying the administrative information even if the request to modify is received.

Furthermore, in the image processing system 1 in this embodiment, if modifying of the apparatus administrative information that corresponds to the reported modifying content is prohibited, the administrative information synchronizer 24 (apparatus information synchronizer) in the main unit of the image processing apparatus 2 instructs a user to choose that either the apparatus administrative information is initialized or the apparatus administrative information is not modified.

In addition, in the image processing system 1 in this embodiment, if modifying of the operational part administrative information that corresponds to the reported modifying content is prohibited, the administrative information synchronizer 32 (operational part information synchronizer) in the operational part 3 instructs a user to choose that either the operational part administrative information is initialized or the operational part administrative information is not modified.

Consequently, between the main unit of the image processing apparatus 2 that the OS 20 is installed and the operational part 3 that the OS 30 independent of the OS 20 is installed, the administrative information managed by the OS 20 can be synchronized with the administrative information managed by the OS 30 if they can be synchronized or need to be synchronized. Otherwise, if that administrative information does not need to be synchronized or cannot be synchronized, it is initialized or is not modified depending on installation environment and availability for a user, and appropriate usable image processing can be guaranteed.

Furthermore, the image processing system 1 in this embodiment includes at least more than one of time, language, timer, volume, network setting, and accounts as the apparatus administrative information and the operational part administrative information.

Consequently, administrative information such as time, language, timer, volume, network setting, and accounts can be synchronized as appropriate and promptly, and image processing can be optimized.

The present invention be a recording medium storing a program that executes a method, performed by an image processing system that includes a main unit of an image processing apparatus to operate on an apparatus operating system and perform image processing based on apparatus administrative information managed by the apparatus operating system and an operational unit to operate on an operational unit operating system independent of the apparatus operating system and perform operation processing to the main unit of the image processing apparatus based on operational unit administrative information manage d by the operational unit operating system. The method of processing an image, performed by the main unit of the image processing apparatus, comprising the steps of receiving a request to modify the apparatus administrative information, modifying the apparatus administrative information in accordance with the received request to modify the apparatus administrative information, reporting modified content of the apparatus administrative information to the operational unit, and modifying the apparatus administrative information that corresponds to modified content of the operational unit administrative information if the modified content of the operational unit administrative information is reported from the operational unit. The method of processing an image, performed by the operational unit, comprising the steps of receiving a request to modify the operational unit administrative information, modifying the operational unit administrative information in accordance with the received request to modify the operational unit administrative information, reporting modified content of the operational unit administrative information to the main unit of the image processing apparatus, and modifying the operational unit administrative information that corresponds to modified content of the operational unit administrative information if the modified content of the apparatus administrative information is reported from the main unit of the image processing apparatus.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An image processing system, comprising:
   an image processing apparatus including a main unit and an operational unit;
   the main unit includes,
      a first memory having a first set of computer readable instructions stored thereon, and
      at least one first processing circuit configured to execute the first set of computer readable instructions to,
      execute an apparatus operating system and perform image processing based on a plurality of apparatus administrative information settings managed by the apparatus operating system, and
      each of the plurality of apparatus administrative information settings including a synchronization type;
   the operational unit includes,
      a second memory having a second set of computer readable instructions stored thereon,
      at least one second processing circuit configured to execute the second set of computer readable instructions to,
      execute an operational unit operating system and perform operation processing to the main unit of the image processing apparatus based on operational unit administrative information managed by the operational unit operating system, the operational unit operating system being independent of the apparatus operating system, and each of the plurality of operational unit administrative information settings including the synchronization type, the synchronization type selected from a set of synchronization types, the set of synchronization types including a necessarily synchronize type, a basically synchronized type, and an occasionally synchronized type, receive a request to modify at least one of the plurality of operational unit administrative information settings, modify the requested operational unit administrative information setting in accordance with the received, and report the modified content of the operational unit administrative information settings; and the at least one first processing circuit further configured to execute the first set of computer readable instructions to, modify at least one of the plurality of apparatus administrative information settings that correspond to the modified content of the operational unit administrative information settings, in response to notification regarding the modified content of the operational unit administrative information settings and the synchronization type of the modified content of the operational unit administrative information settings, and based on whether the synchronization type of the apparatus administrative information setting indicates that the reported modified content is prohibited from being modified, initialize the apparatus administrative information settings to a desired apparatus administrative information setting.

2. The image processing system according to claim 1, wherein the at least one first processing circuit is further configured to execute the first set of computer readable instructions to:

receive a request to modify at least one of the plurality of apparatus administrative information settings;

modify at least one of the plurality of operational unit administrative information settings in accordance with the received request to modify the operational unit administrative information; and report the modified content of the operational unit administrative information settings; and the at least one second processing circuit is further configured to execute the second set of computer readable instructions to, receive notification of modified content of the apparatus administrative information settings from the main unit of the image processing apparatus, and modify the operational unit administrative information settings that corresponds to the notified modified content in accordance with the synchronization type of the corresponding operational unit administrative information settings.

3. The image processing system according to claim 2, wherein the at least one second processing circuit is further configured to execute the second set of computer readable instructions to either initialize the operational unit administrative information settings or not modify the operational unit administrative information settings based on whether the synchronization type of the operational unit administrative information settings indicates that the reported modified content is prohibited from being modified.

4. The image processing system according to claim 1, wherein the at least one first processing circuit is further configured to execute the first set of computer readable instructions to not modify the apparatus administrative information settings based on when the synchronization type of the apparatus administrative information settings indicates that the reported modified content is prohibited from being modified and the apparatus administrative information setting is not available.

5. The image processing system according to claim 2, wherein the at least one second processing circuit is further configured to execute the second set of computer readable instructions to not modify the operational unit administrative information settings based on whether the synchronization type of the operational unit administrative information settings indicates that the reported modified content is prohibited from being modified and the apparatus administrative information setting is not available.

6. The image processing system according to claim 1, wherein the plurality of apparatus administrative information settings and the plurality of operational unit administrative information settings each include at least one of time, language, timer, volume, network setting, and accounts settings.

7. The image processing system according to claim 6, wherein the synchronization type of the time setting and the network setting is necessarily synchronize type.

8. The image processing system according to claim 1, wherein the set of synchronization types includes a plurality of synchronization types including the necessarily synchronize type, the basically synchronized type, and the occasionally synchronized type.

9. The image processing system according to claim 1, wherein when the synchronization type of the at least one apparatus administrative setting to be modified is the necessarily synchronized type, the at least one first processing circuit is configured to execute the first set of computer readable instructions to acquire the modified content of the operational unit administrative information settings, and always modify the at least one apparatus administrative setting based on the modified content;

when the synchronization type of the at least one apparatus administrative setting to be modified is the basically synchronized type, the at least one first processing circuit is configured to execute the first set of computer readable instructions to acquire the modified content of the operational unit administrative information settings, determine whether an apparatus administrative setting corresponding to the operational unit administrative setting is available, and based on results of the determination, modify the corresponding apparatus administrative setting using the modified content; and when the synchronization type of the at least one apparatus administrative setting to be modified is the occasionally synchronized type, the at least one first processing circuit is configured to execute the first set of computer readable instructions to acquire the modified content of the operational unit administrative information settings, determine whether an apparatus administrative setting corresponding to the operational unit administrative setting is available, and based on results of the determination, ignore the modified content.

10. An image processing apparatus, comprising:
a main unit including,
 a first memory having a first set of computer readable instructions stored thereon, and
 at least one first processing circuit configured to execute the first set of computer readable instructions to,
 execute an apparatus operating system and perform image processing based on a plurality of apparatus administrative information settings managed by the apparatus operating system, and
 each of the plurality of apparatus administrative information settings including a synchronization type, the synchronization type being selected from a set of synchronization types, the set of synchronization types including a necessarily synchronize type, a basically synchronized type, and an occasionally synchronized type; and
  an operational unit including, a second memory having a second set of computer readable instructions stored thereon,
 at least one second processing circuit configured to execute the second set of computer readable instructions to,
  execute an operational unit operating system and perform operation processing to the main unit of the image processing apparatus based on operational unit administrative information managed by the operational unit operating system, the operational unit operating system being independent of the apparatus operating system, and
  each of the plurality of operational unit administrative information settings including the synchronization type;
the at least one first processing circuit is further configured to execute the first set of computer readable instructions to,
 receive a request to modify at least one of the plurality of apparatus administrative information settings,
 modify the requested operational unit administrative information setting in accordance with the received request
 report the modified content of the operational unit administrative information settings; and
the at least one second processing circuit is further configured to execute the second set of computer readable instructions to receive notification of modified content of the apparatus administrative information settings from the main unit of the image processing apparatus and modify the operational unit administrative information settings that corresponds to the notified modified content based on the synchronization type of the modified content of the apparatus unit administrative information settings, and
 based on whether the synchronization type of the apparatus administrative information setting indicates that the reported modified content is prohibited from being modified, initialize the apparatus administrative information settings to a desired apparatus administrative information setting.

11. The image processing apparatus according to claim 10, wherein the at least one first processing circuit is further configured to execute the first set of computer readable instructions to instruct to choose either to initialize the operational unit administrative information settings or not to modify the operational unit administrative information settings based on whether the synchronization type of the operational unit administrative information settings indicates that the reported modified content is prohibited from being modified.

12. The image processing apparatus according to claim 10, wherein the set of synchronization types includes a plurality of synchronization types including the necessarily synchronize type, the basically synchronized type, and the occasionally synchronized type.

13. The image processing apparatus according to claim 10, wherein the plurality of apparatus administrative information settings and the plurality of operational unit administrative information settings each include at least one of time, language, timer, volume, network setting, and accounts settings.

14. The image processing apparatus according to claim 13, wherein the synchronization type of the time setting and the network setting is necessarily synchronize type.

15. The image processing apparatus according to claim 10, wherein
 when the synchronization type of the at least one apparatus administrative setting to be modified is the necessarily synchronized type, the at least one first processing circuit is configured to execute the first set of computer readable instructions to acquire the modified content of the operational unit administrative information settings, and always modify the at least one apparatus administrative setting based on the modified content;
 when the synchronization type of the at least one apparatus administrative setting to be modified is the basically synchronized type, the at least one first processing circuit is configured to execute the first set of computer readable instructions to acquire the modified content of the operational unit administrative information settings, determine whether an apparatus administrative setting corresponding to the operational unit administrative setting is available, and based on results of the determination, modify the corresponding apparatus administrative setting using the modified content; and
 when the synchronization type of the at least one apparatus administrative setting to be modified is the occasionally synchronized type, the at least one first processing circuit is configured to execute the first set of computer readable instructions to acquire the modified content of the operational unit administrative information settings, determine whether an apparatus administrative setting corresponding to the operational unit administrative setting is available, and based on results of the determination, ignore the modified content.

16. A method of synchronizing information comprising:
 receiving, using at least one processor, a request to modify at least one of a plurality of apparatus administrative information settings on an image processing apparatus including a main unit and an operational unit;
 modifying, using the at least one processor, the requested apparatus administrative information settings in accordance with the received request; and
 reporting modified content of the apparatus administrative information settings to the operational unit;
 modifying, using the at least one processor, at least one of the plurality of apparatus administrative information settings that correspond to modified content of the operational unit administrative information settings based on whether the modified content of the operational unit administrative information settings is reported from the operational unit and in accordance with a synchronization type of the corresponding apparatus administrative information settings, each of the plurality of operational unit administrative information settings including the synchronization type, the synchronization type being selected from a set of synchronization types, the set of synchronization types including a necessarily synchronize type, a basically synchronized type, and an occasionally synchronized type;

receiving, using the at least one processor, a request to modify at least one of the plurality of operational unit administrative information settings;

modifying, using the at least one processor, the requested operational unit administrative information settings in accordance with the received request;

reporting, using the at least one processor, modified content of the operational unit administrative information settings to the main unit of the image processing apparatus;

modifying, using the at least one processor, at least one of the plurality of operational unit administrative information settings that corresponds to modified content of the operational unit administrative information settings based on whether the modified content of the apparatus administrative information is reported from the main unit of the image processing apparatus and in accordance with the synchronization type of the corresponding operational unit administrative information settings;

receiving, using the at least one processor, notification of modified content of the apparatus administrative information settings from the main unit, modifying, using the at least one processor, the operational unit administrative information settings that corresponds to the notified modified content based on the synchronization type of the modified content of the apparatus unit administrative information settings, and based on whether the synchronization type of the apparatus administrative information setting indicates that the reported modified content is prohibited from being modified, initialize the apparatus administrative information settings to a desired apparatus administrative information setting.

17. The method according to claim 16, wherein the set of synchronization types includes a plurality of synchronization types including the necessarily synchronize type, the basically synchronized type, and the occasionally synchronized type.

18. The method according to claim 16, wherein the plurality of apparatus administrative information settings and the plurality of operational unit administrative information settings each include at least one of time, language, timer, volume, network setting, and accounts settings.

19. The method according to claim 16, wherein
when the synchronization type of the at least one apparatus administrative setting to be modified is the necessarily synchronized type, the modifying the at least one of the plurality of apparatus administrative information settings that correspond to modified content of the operational unit administrative information settings includes acquiring the modified content of the operational unit administrative information settings, and always modifying the at least one apparatus administrative setting based on the modified content;

when the synchronization type of the at least one apparatus administrative setting to be modified is the basically synchronized type, the modifying the at least one of the plurality of apparatus administrative information settings that correspond to modified content of the operational unit administrative information settings includes acquiring the modified content of the operational unit administrative information settings, determining whether an apparatus administrative setting corresponding to the operational unit administrative setting is available, and based on results of the determining, modifying the corresponding apparatus administrative setting using the modified content; and when the synchronization type of the at least one apparatus administrative setting to be modified is the occasionally synchronized type, the modifying the at least one of the plurality of apparatus administrative information settings that correspond to modified content of the operational unit administrative information settings includes acquiring the modified content of the operational unit administrative information settings, determining whether an apparatus administrative setting corresponding to the operational unit administrative setting is available, and based on results of the determining, ignoring the modified content.

20. The method according to claim 18, wherein the synchronization type of the time setting and the network setting is necessarily synchronize type.

* * * * *